(12) United States Patent
Miyake et al.

(10) Patent No.: US 10,802,814 B2
(45) Date of Patent: Oct. 13, 2020

(54) VEHICLE CONTROL DEVICE, UPDATE CONFIRMATION METHOD OF PROGRAM, AND NON-TRANSITORY COMPUTER READABLE MEDIUM STORING UPDATE CONFIRMATION PROGRAM

(71) Applicant: TOYOTA JIDOSHA KABUSHIKI KAISHA, Toyota-shi, Aichi-ken (JP)

(72) Inventors: Masaki Miyake, Toyota (JP); Yasuyuki Miyazaki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/265,143

(22) Filed: Feb. 1, 2019

(65) Prior Publication Data

US 2019/0258470 A1 Aug. 22, 2019

(30) Foreign Application Priority Data

Feb. 16, 2018 (JP) .................. 2018-026152

(51) Int. Cl.
*G06F 8/65* (2018.01)
*G06F 9/445* (2018.01)
(Continued)

(52) U.S. Cl.
CPC .............. *G06F 8/65* (2013.01); *G06F 3/0604* (2013.01); *G06F 3/067* (2013.01); *G06F 3/0659* (2013.01);
(Continued)

(58) Field of Classification Search
CPC ...... G06F 11/1629; G06F 11/14; G06F 11/00; G06F 8/65; G06F 21/57; G06F 3/0604;
(Continued)

(56) References Cited

U.S. PATENT DOCUMENTS 8,144,612 B2 * 3/2012 Johnson ............... H04N 21/235
370/252
9,916,151 B2 * 3/2018 Ye ........................... G06F 8/65
(Continued)

FOREIGN PATENT DOCUMENTS

JP 2016-060407 A 4/2016

OTHER PUBLICATIONS

Thomas Strang et al., Communication Technologies for Vehicles, Mar. 2011, [Retrieved on Jun. 10, 2020]. Retrieved from the internet: <URL: https://link.springer.com/content/pdf/10.1007% 2F978-3-642-19786-4.pdf> 250 Pages. (1-237) (Year: 2011).*

(Continued)

*Primary Examiner* — Anibal Rivera
(74) *Attorney, Agent, or Firm* — Oliff PLC (57) ABSTRACT

A vehicle control device includes a first storage configured to store a first control program, a second storage configured to store a second control program, a first processor configured to execute the first control program, a second processor configured to execute the second control program, and an updating unit configured to store a first update program in the first storage and then change an execution target program of the first processor to the first update program. In a case where the updating unit changes the execution target program of the first processor to the first update program, the second processor is configured to acquire an identifier included in the execution target program of the first processor from the first processor and confirm that the execution target program of the first processor has been changed to the first update program based on at least the identifier.

10 Claims, 7 Drawing Sheets

(51) Int. Cl.
*B60R 16/023* (2006.01)
*G06F 3/06* (2006.01)
*B60W 50/00* (2006.01)
*B60W 50/02* (2012.01)

(52) U.S. Cl.
CPC ............ *B60R 16/023* (2013.01); *B60W 50/00* (2013.01); *B60W 50/0225* (2013.01); *B60W 2050/0083* (2013.01)

(58) Field of Classification Search
CPC ...... G06F 3/0659; G06F 3/067; B60W 50/00; B60W 50/0225; B60W 2050/0083; B60R 16/023
See application file for complete search history.

(56) References Cited

U.S. PATENT DOCUMENTS

| | | | | |
|---|---|---|---|---|
| 2014/0351803 | A1* | 11/2014 | Hoffman | G06F 8/65 717/168 |
| 2015/0309784 | A1* | 10/2015 | Molin | F01N 9/002 701/71 |
| 2016/0176411 | A1* | 6/2016 | Tran | G06F 11/1456 701/36 |
| 2016/0264071 | A1* | 9/2016 | Ujiie | H04L 63/123 |
| 2017/0060559 | A1* | 3/2017 | Ye | H04L 67/12 |
| 2017/0134164 | A1* | 5/2017 | Haga | G06F 8/65 |
| 2018/0074811 | A1* | 3/2018 | Kiyama | H04L 67/10 |
| 2018/0081671 | A1* | 3/2018 | Naruse | B60R 16/0231 |
| 2018/0136924 | A1* | 5/2018 | Okuyama | G06F 8/65 |
| 2018/0189049 | A1* | 7/2018 | Madrid | G06F 21/78 |
| 2018/0196660 | A1* | 7/2018 | Rivas Silva | G06F 21/44 |
| 2018/0232223 | A1* | 8/2018 | Madrid | H04L 67/34 |
| 2019/0031203 | A1* | 1/2019 | Fox | G06F 8/654 |
| 2019/0163466 | A1* | 5/2019 | Kiyama | G06F 8/65 |
| 2019/0235855 | A1* | 8/2019 | Nakano | G06F 13/4204 |
| 2019/0265965 | A1* | 8/2019 | Acharya | H04L 67/141 |
| 2020/0065087 | A1* | 2/2020 | Miura | H04L 67/12 |

OTHER PUBLICATIONS

Manfred Broy et al., Engineering Automotive Software, 2007 IEEE, [Retrieved on Jun. 10, 2020]. Retrieved from the internet: <URL: https://ieeexplore.ieee.org/stamp/stamp.jsp?tp=&arnumber=4142919> 18 Pages (356-373) (Year: 2007).*

* cited by examiner

VEHICLE CONTROL DEVICE, UPDATE CONFIRMATION METHOD OF PROGRAM, AND NON-TRANSITORY COMPUTER READABLE MEDIUM STORING UPDATE CONFIRMATION PROGRAM

INCORPORATION BY REFERENCE

The disclosure of Japanese Patent Application No. 2018-026152 filed on Feb. 16, 2018 including the specification, drawings and abstract is incorporated herein by reference in its entirety.

BACKGROUND

1. Technical Field

The disclosure relates to a vehicle control device mounted in a vehicle or the like, an update confirmation method of a program for the vehicle control device, and a non-transitory computer readable medium storing an update confirmation program of the program.

2. Description of Related Art

In a vehicle, a plurality of control devices including a storage and a controller (processor), which is called an electronic control unit (ECU), is mounted, and the controller executes a program stored in the storage to perform a process for various types of vehicle control.

Such a program may be updated for improvement or addition of functions. Japanese Unexamined Patent Application Publication No. 2016-060407 (JP 2016-060407 A) discloses a system that performs updating by rewriting a program with program update data, which is downloaded to a mobile terminal device via a network and is provided from the mobile terminal device to a vehicle.

SUMMARY

Due to the sophistication and complexity of ECUs, there are ECUs that have a plurality of processors and that execute different programs. In such an ECU, there is a possibility that a deviation occurs for each program at execution timings of various processes, such as the process of writing an update program to a storage or the process of switching an execution target program from the one before updating to the one after updating. When such a deviation occurs, a part of the execution target program is not changed to the program after the updating at the time of activation of the ECUs, and a state in which a version before updating and a version after updating of each program are mixed in an unexpected combination may occur. In such a state, there is a possibility that the ECUs perform unintended operations.

The disclosure provides a vehicle control device capable of, at the time of updating a program, confirming that an execution target program has been changed from the program before updating to the program after updating, an update confirmation method of the program, and a non-transitory computer readable medium storing an update confirmation program of the program.

A first aspect of the disclosure relates to a vehicle control device. The vehicle control device includes a first storage, a second storage, a first processor, a second processor, and an updating unit. The first storage is configured to store a first control program for controlling a vehicle. The second storage is configured to store a second control program for controlling the vehicle. The first processor is configured to execute the first control program. The second processor is configured to execute the second control program. The updating unit is configured to generate a first update program based on update data acquired from a device external to the vehicle via a network, store the first update program in the first storage, and then change an execution target program of the first processor to the first update program. The first update program is an updated version of the first control program. In a case where the updating unit changes the execution target program of the first processor to the first update program, the second processor is configured to acquire an identifier included in the execution target program of the first processor from the first processor and confirm that the execution target program of the first processor has been changed to the first update program based on at least the identifier acquired from the first processor.

According to the first aspect, in a case where the first control program is updated to the first update program, the second processor can confirm that the execution target program of the first processor has been changed to the first update program.

In the vehicle control device according to the first aspect of the disclosure, the updating unit may be further configured to generate a second update program based on the update data, store the second update program in the second storage, and then change an execution target program of the second processor to the second update program. The second update program is an updated version of the second control program. In a case where the updating unit changes the execution target program of the second processor to the second update program, the first processor may be configured to acquire an identifier included in the execution target program of the second processor from the second processor and confirm that the execution target program of the second processor has been changed to the second update program based on at least the identifier acquired from the second processor.

According to the aspect, in a case where the second control program is further updated to the second update program, the first processor can confirm that the execution target program of the second processor has been changed to the second update program.

In the vehicle control device according to the aspect of the disclosure, in a case where the updating unit changes the execution target program of the first processor to the first update program and changes the execution target program of the second processor to the second update program, when the first processor confirms that the execution target program of the second processor has been changed to the second update program, and the second processor confirms that the execution target program of the first processor has been changed to the first update program, the first processor may be configured to execute the first update program, and the second processor may be configured to execute the second update program.

According to the aspect, since the update program is executed in a case where the execution target program is correctly changed to the program after updating, a possibility that an unintended operation is performed can be reduced.

In the vehicle control device according to the aspect of the disclosure, in a case where the updating unit changes the execution target program of the first processor to the first update program and changes the execution target program of the second processor to the second update program, the updating unit may be configured to store the first update program in an area in the first storage other than an area where the first control program is stored and store the second update program in an area in the second storage other than an area where the second control program is stored. In at least one of a case where the first processor does not confirm that the execution target program of the second processor has been changed to the second update program, or a case where the second processor does not confirm that the execution target program of the first processor has been changed to the first update program, the first processor may be configured to execute the first control program, and the second processor may be configured to execute the second control program.

According to the aspect, since each processor executes the program before updating in a case where the execution target program is not correctly changed to the program after updating, a possibility that an unintended operation is performed can be reduced.

In the vehicle control device according to the aspect of the disclosure, in a case where the updating unit changes the execution target program of the first processor to the first update program and does not change the execution target program of the second processor to the second update program, when the first processor acquires the identifier included in the execution target program of the second processor from the second processor and confirms that the execution target program of the second processor has not been changed from the second control program based on at least the identifier acquired from the second processor, and the second processor confirms that the execution target program of the first processor has been changed to the first update program, the first processor may be configured to execute the first update program, and the second processor may be configured to execute the second control program.

According to the aspect, since the update program is executed in a case where the execution target program is correctly changed to the program after updating, a possibility that an unintended operation is performed can be reduced.

In the vehicle control device according to the aspect of the disclosure, in a case where the updating unit changes the execution target program of the first processor to the first update program and does not change the execution target program of the second processor to the second update program, the updating unit may be configured to store the first update program in an area in the first storage other than an area where the first control program is stored. In a case where the first processor acquires the identifier included in the execution target program of the second processor from the second processor and confirms that the execution target program of the second processor has not been changed from the second control program based on at least the identifier acquired from the second processor, and the second processor does not confirm that the execution target program of the first processor has been changed to the first update program, the first processor may be configured to execute the first control program, and the second processor may be configured to execute the second control program.

According to the aspect, since each processor executes the program before updating in a case where the execution target program is not correctly changed to the program after updating, a possibility that an unintended operation is performed can be reduced.

The vehicle control device according to the aspect of the disclosure may further include a third storage and a third processor. The third storage is configured to store a third control program for controlling the vehicle. The third processor is configured to execute the third control program. The updating unit may be further configured to generate a third update program based on the update data, store the third update program in the third storage, and then change an execution target program of the third processor to the third update program. The third update program is an updated version of the third control program. In a case where the updating unit changes the execution target program of the third processor to the third update program, the first processor may be configured to acquire an identifier included in the execution target program of the third processor from the third processor and confirm that the execution target program of the third processor has been changed to the third update program based on at least the identifier acquired from the third processor.

According to the aspect, three or more processors can mutually confirm execution target programs.

A second aspect of the disclosure relates to an update confirmation method of a program executed by a second processor of a vehicle control device. The vehicle control device includes a first storage, a second storage, a first processor, a second processor, and an updating unit. The first storage is configured to store a first control program for controlling a vehicle. The second storage is configured to store a second control program for controlling the vehicle. The first processor is configured to execute the first control program. The second processor is configured to execute the second control program. The updating unit is configured to generate a first update program based on update data acquired from a device external to the vehicle via a network, store the first update program in the first storage, and then change an execution target program of the first processor to the first update program. The first update program is an updated version of the first control program. The update confirmation method includes in a case where the updating unit changes the execution target program of the first processor to the first update program, acquiring an identifier included in the execution target program of the first processor from the first processor, and confirming that the execution target program of the first processor has been changed to the first update program based on at least the identifier acquired from the first processor.

A third aspect of the disclosure relates to a non-transitory computer readable medium storing an update confirmation program to confirm whether a program executed by a second processor of a vehicle control device has been updated. The vehicle control device includes a first storage, a second storage, a first processor, a second processor, and an updating unit. The first storage is configured to store a first control program for controlling a vehicle. The second storage is configured to store a second control program for controlling the vehicle. The first processor is configured to execute the first control program. The second processor is configured to execute the second control program. The updating unit is configured to generate a first update program based on update data acquired from a device external to the vehicle via a network, store the first update program in the first storage, and then change an execution target program of the first processor to the first update program. The first update program is an updated version of the first control program. The update confirmation program includes processing of, in a case where the updating unit changes the execution target program of the first processor to the first update program, acquiring an identifier included in the execution target program of the first processor from the first processor, and confirming that the execution target program of the first processor has been changed to the first update program based on at least the identifier acquired from the first processor.

According to the second and third aspects, in a case where the first control program is updated to the first update program, the second processor can confirm that the execution target program of the first processor has been changed to the first update program.

According to the aspects of the disclosure, as described above, at the time of updating a program, since one processor acquires and confirms an identifier of an execution target program of another processor, it is possible to provide a vehicle control device capable of confirming that the program has been correctly changed, an update confirmation method of the program, and a non-transitory computer readable medium storing an update confirmation program of the program.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Overview

A vehicle control device according to an embodiment of the disclosure has a plurality of execution units executing respective programs. In a case where the program is updated, each execution unit acquires and confirms an identifier of an execution target program from another execution unit, so that it is possible to confirm whether the execution target program has been changed to the updated program.

Embodiment

Hereinafter, one embodiment of the disclosure will be described in detail with reference to the drawings.

Configuration

Figure 1:
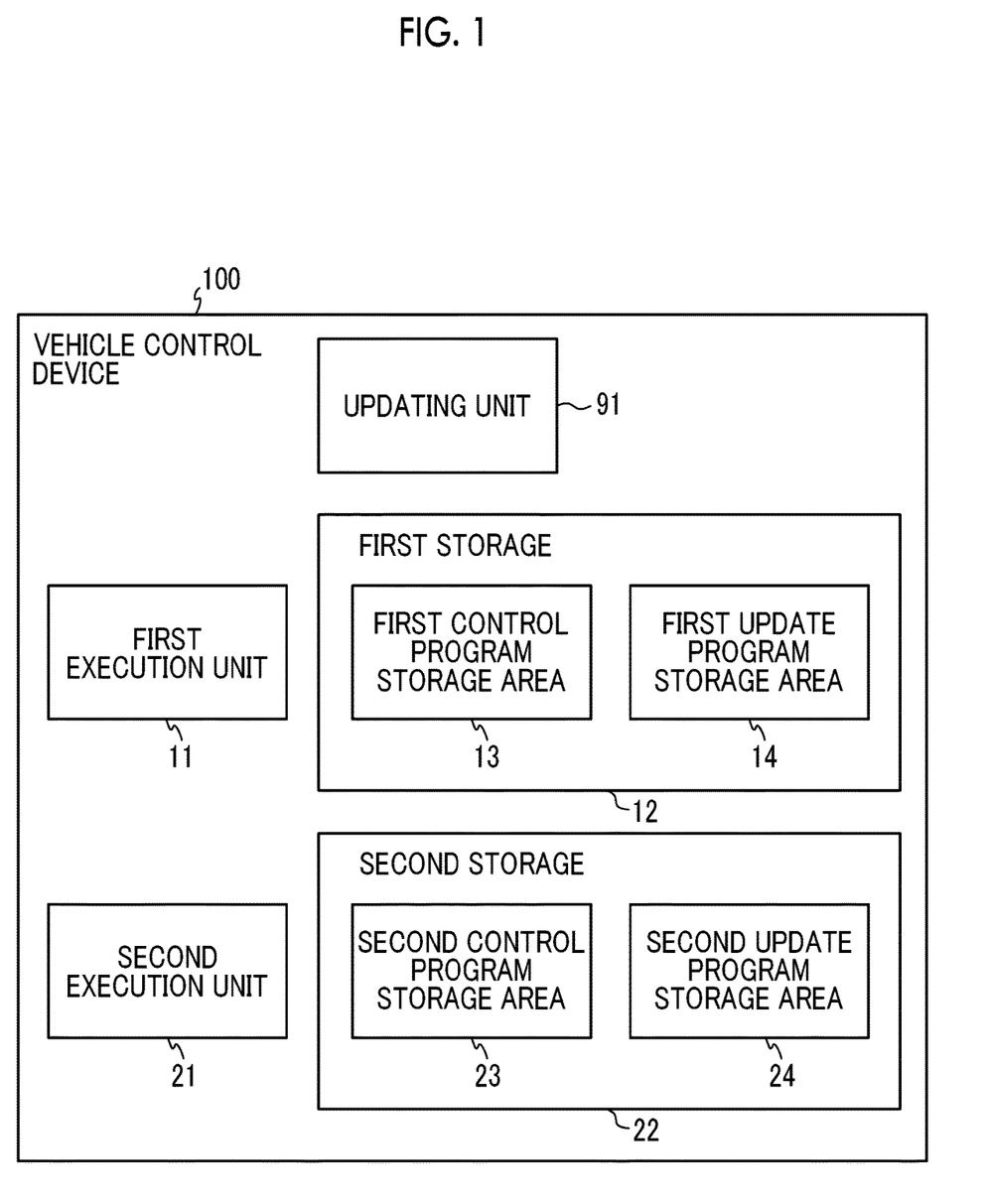
FIG. 1 is a functional block diagram of a vehicle control device according to an embodiment of the disclosure.

FIG. 1 shows a functional block diagram of a vehicle control device 100 in the embodiment. The vehicle control device 100 is, for example, an autonomous driving ECU that performs autonomous driving control of a vehicle, and controls steering, an engine, a brake, and the like based on inputs from various sensors to drive the vehicle. The vehicle control device 100 includes a first execution unit 11 and a second execution unit 21 which are processors, and a first storage 12 and a second storage 22 which are nonvolatile memories such as a Flash Read Only Memory (ROM). The first storage 12 has a first control program storage area 13 and a first update program storage area 14. The first execution unit 11 is a processor and executes a first control program, which is a current execution target program, stored in the first control program storage area 13. The second execution unit 21 is a processor and executes a second control program, which is a current execution target program, stored in a second control program storage area 23. Further, the vehicle control device 100 may include a volatile Random Access Memory (RAM). By the execution output of these programs, the autonomous driving control described above is performed.

An updating unit 91 acquires update data received by an Over the Air (OTA) receiver or the like mounted in the vehicle from a server or the like outside the vehicle via a network. When the update data is acquired, the updating unit 91 can generate one or both of a first update program which is an updated version of the first control program and a second update program which is an updated version of the second control program, based on the update data. The updating unit 91 stores the first update program in the first update program storage area 14 of the first storage 12 and stores the second update program in a second update program storage area 24 of the second storage 22. The functions of the updating unit 91 may be executed by the first execution unit 11 and the second execution unit 21.

Figure 2:
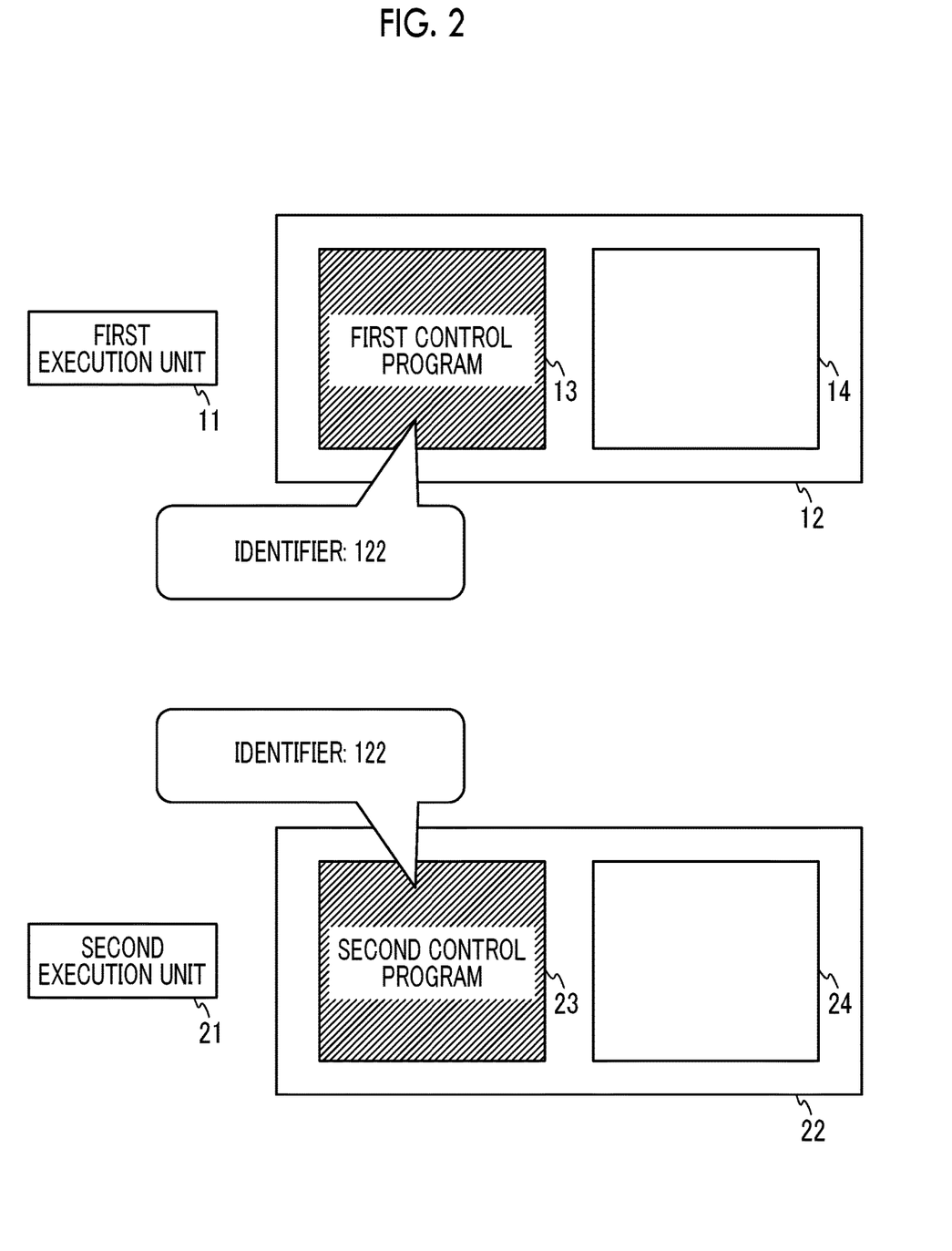
FIG. 2 is a schematic diagram of an execution unit and a storage of the vehicle control device according to the embodiment of the disclosure, in one situation.

FIG. 2 shows schematically each execution unit and each storage of the vehicle control device 100 in a case where the first update program is not stored in the first storage 12 and the second update program is not stored in the second storage 22. The first control program includes an identifier, which is "122" in the illustrated example. This indicates the version of the first control program. Similarly, the second control program includes an identifier, which is "122" in the illustrated example. This indicates the version of the second control program. Therefore, in the state illustrated in the drawing, the first control program and the second control program are a set of versions to be simultaneously executed.

Process 1

Figure 3:
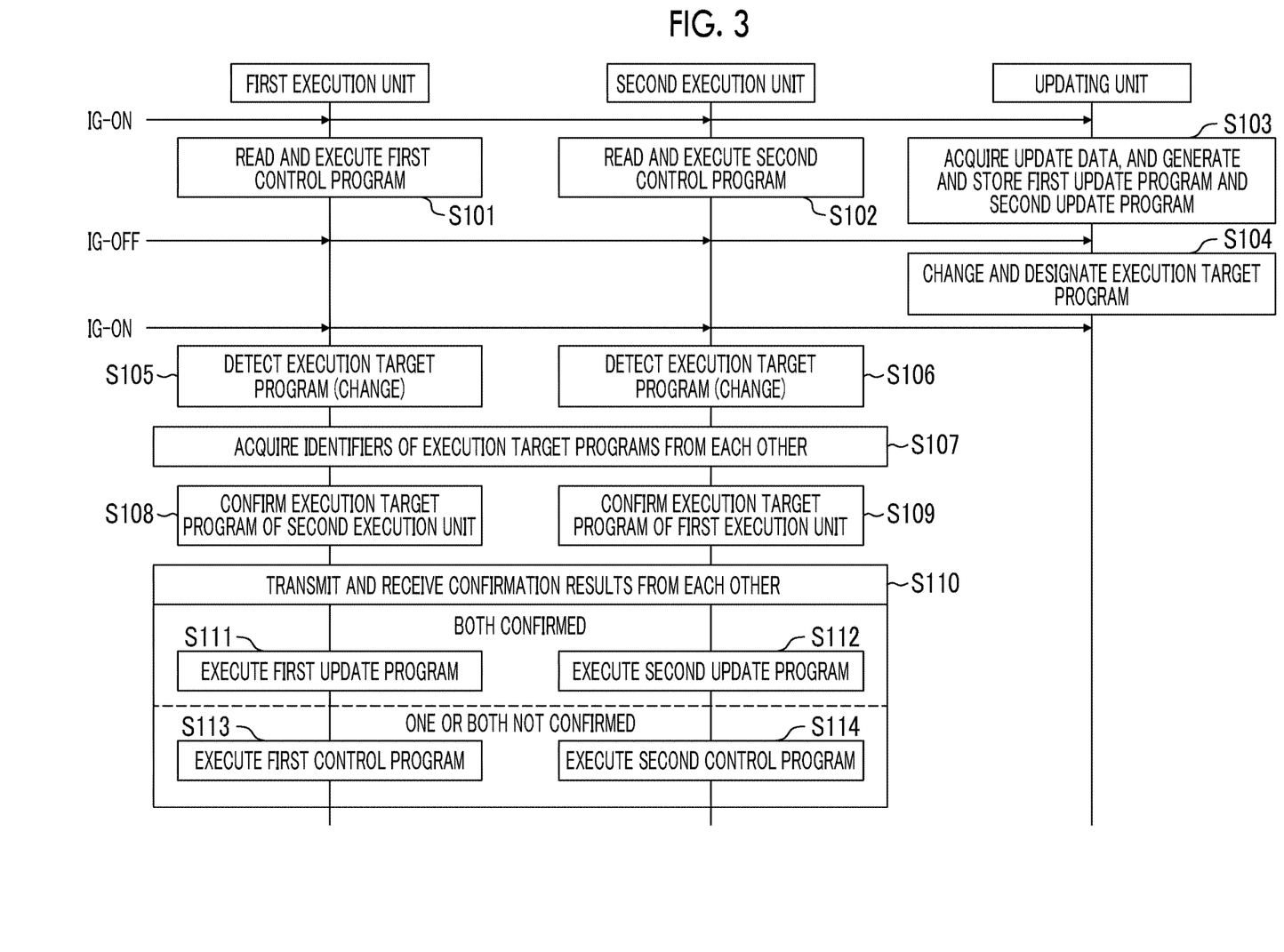
FIG. 3 is a sequence diagram illustrating a process of the vehicle control device according to the embodiment of the disclosure.

An example of a program update process according to the embodiment will be described below. First, a case where both the first control program and the second control program are updated will be described. FIG. 3 is a sequence describing the process. This sequence is started, for example, when an ignition switch is turned on.

Step S101

The first execution unit 11 reads and executes the first control program. The first execution unit 11 can determine to read the first control program from the first control program storage area 13 as an execution target program, for example, based on first read destination information including an address or the like in which a read destination of the program is designated, stored in the first storage 12. The first read destination information is, for example, information that the updating unit 91 writes in the first storage 12, and includes information for designating a read destination of the program to the first execution unit 11, a flag indicating that the information has been changed, or the like.

Step S102

The second execution unit 21 reads and executes the second control program. The second execution unit 21 can determine to read the second control program from the second control program storage area 23 as an execution target program, for example, based on second read destination information stored in the second storage 22. The second read destination information is, for example, information that the updating unit 91 writes in the second storage 22, and includes information for designating a read destination of the program to the second execution unit 21, a flag indicating that the information has been changed, or the like.

Step S103

The updating unit 91 generates the first update program and the second update program based on the update data. Although the format of the update data is not particularly limited, it may be, for example, differential data including an updated part from the program before updating, compressed data thereof, or the entire update program. The updating unit 91 stores the first update program in the first update program storage area 14 of the first storage 12 and stores the second update program in the second update program storage area 24 of the second storage 22.

When the above-described processes of steps S101, S102, and S103 are executed, and the ignition switch is turned off, the following process is performed.

Step S104

The updating unit 91 changes the execution target program such that the read destination address included in the first read destination information stored in the first storage 12 designates the first update program storage area 14 and designates the execution target program such that the first execution unit 11 reads the first update program from the first update program storage area 14 when the first execution unit 11 reads the next execution target program by setting a flag indicating that there has been a change. Further, the updating unit 91 changes the execution target program such that the read destination address of second read destination information stored in the second storage 22 designates the second update program storage area 24 and designates the execution target program such that the second execution unit 21 reads the second update program from the second update program storage area 24 when the second execution unit 21 reads the next execution target program by setting a flag indicating that there has been a change.

Figure 4:
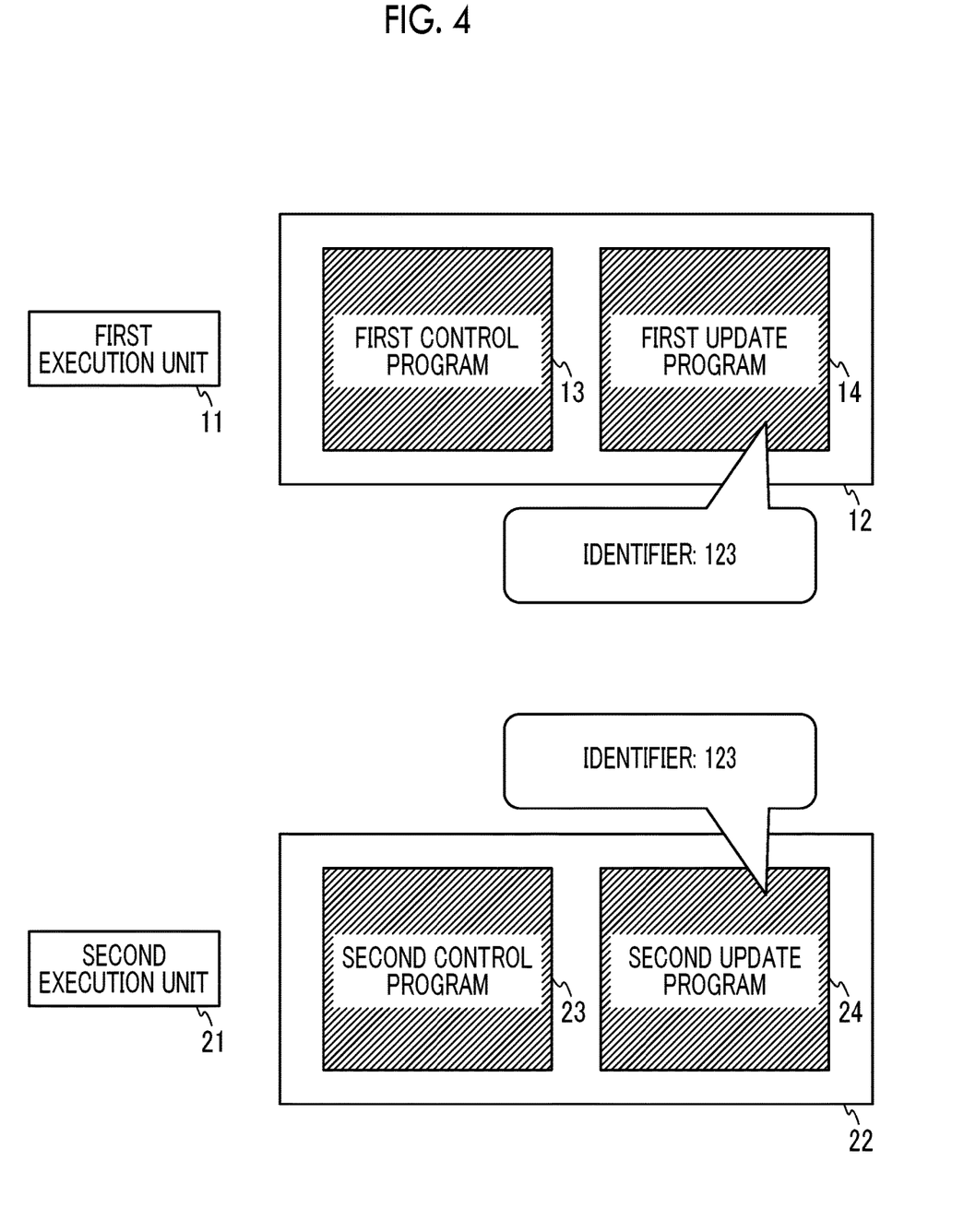
FIG. 4 is a schematic diagram of the execution unit and the storage of the vehicle control device according to the embodiment of the disclosure, in another situation.

When the above-described process of step S104 is executed and then the ignition switch is turned on, the following process is performed. FIG. 4 shows schematically each execution unit and each storage of the vehicle control device 100 in a case where the first update program is stored in the first storage 12 and the second update program is stored in the second storage 22. The first update program includes an identifier, which is "123" in the illustrated example. This indicates the version of the first update program. Similarly, the second update program includes an identifier, which is "123" in the illustrated example. This indicates the version of the second update program. Therefore, in the state illustrated in the drawing, the first update program and the second update program are a set of the same version.

Step S105

For example, the first execution unit 11 refers to the first read destination information stored in the first storage 12 and detects that the execution target program has been changed from the first control program stored in the first control program storage area 13 to the first update program stored in the first update program storage area 14.

Step S106

For example, the second execution unit 21 refers to the second read destination information stored in the second storage 22 and detects that the execution target program has been changed from the second control program stored in the second control program storage area 23 to the second update program stored in the second update program storage area 24.

Step S107

The first execution unit 11 reads the identifier from the first update program and notifies the second execution unit 21 of the read identifier. The second execution unit 21 reads the identifier from the second update program and notifies the first execution unit 11 of the read identifier. In this manner, the first execution unit 11 and the second execution unit 21 can acquire the identifiers of the execution target programs from each other.

Step S108

The first execution unit 11 confirms whether the execution target program of the second execution unit 21 has been correctly changed to the second update program, based on the notified identifier of the second update program. For example, the first execution unit 11 compares the notified identifier of the second update program with the read identifier of the first update program, and since these identifiers represent the same version, the first execution unit 11 confirms that the execution target program of the second execution unit 21 has been correctly changed to the second update program. Further, the first execution unit 11 stores the identifier of the second control program in the first storage 12, and since the notified identifier of the second update program represents the next version of the identifier of the second control program, the first execution unit 11 may confirm that the execution target program of the second execution unit 21 has been correctly changed to the second update program. The order of the versions may be confirmed by conforming to a predetermined rule and the identifier representing the previous version may also be included in the second update program to be confirmed that it matches the identifier of the second control program.

Step S109

The second execution unit 21 confirms whether the execution target program of the first execution unit 11 has been correctly changed to the first update program, based on the notified identifier of the first update program. For example, the second execution unit 21 compares the notified identifier of the first update program with the read identifier of the second update program, and since these identifiers represent the same version, the second execution unit 21 confirms that the execution target program of the first execution unit 11 has been correctly changed to the first update program. Further, the second execution unit 21 stores the identifier of the first control program in the second storage 22, and since the notified identifier of the first update program represents the next version of the identifier of the first control program, the second execution unit 21 may confirm that the execution target program of the first execution unit 11 has been correctly changed to the first update program. The order of the versions may be confirmed by conforming to a predetermined rule and the identifier representing the previous version may also be included in the first update program to be confirmed that it matches the identifier of the first control program.

Step S110

The first execution unit 11 notifies the second execution unit 21 of the confirmation result of step S108. In addition, the second execution unit 21 notifies the first execution unit 11 of the confirmation result of step S109.

Step S111

In steps S108 and S109, in a case where it is confirmed that the execution target program of the first execution unit 11 has been correctly changed to the first update program and that the execution target program of the second execution unit 21 has been correctly changed to the second update program, the first execution unit 11 reads and executes the first update program from the first update program storage area 14.

Step S112

In steps S108 and S109, in a case where it is confirmed that the execution target program of the first execution unit 11 has been correctly changed to the first update program and that the execution target program of the second execution unit 21 has been correctly changed to the second update program, the second execution unit 21 reads and executes the second update program from the second update program storage area 24. In a case where it is confirmed that the execution target program of the first execution unit 11 has been correctly changed to the first update program and that the execution target program of the second execution unit 21 has been correctly changed to the second update program, the updating unit 91 may receive the notification from the first execution unit 11 and the second execution unit 21, and use the first control program storage area 13 and the second control program storage area 23 as areas for storing the first update program and the second update program when the next update data is received, respectively, in step S111 and step S112.

Step S113

In steps S108 and S109, in a case where one or both of the fact that the execution target program of the first execution unit 11 has been correctly changed to the first update program and that the execution target program of the second execution unit 21 has been correctly changed to the second update program is not confirmed, the first execution unit 11 reads and executes the first control program from the first control program storage area 13. Further, the first execution unit 11 causes the read destination address of the first read destination information stored in the first storage 12 to designate the first control program storage area 13, and lowers the flag.

Step S114

In steps S108 and S109, in a case where one or both of the fact that the execution target program of the first execution unit 11 has been correctly changed to the first update program and that the execution target program of the second execution unit 21 has been correctly changed to the second update program is not confirmed, the second execution unit 21 reads and executes the second control program from the second control program storage area 23. Further, the second execution unit 21 causes the read destination address of the second read destination information stored in the second storage 22 to designate the second control program storage area 23, and lowers the flag. Although not particularly limited, it is desirable to confirm that the execution targets are correctly the first control program and the second control program by referring to the identifiers of these programs before executing the first control program and the second control program in steps S113 and S114. In addition, although not particularly limited, in order to be able to execute the first control program and the second control program in this manner, the updating unit 91 desirably stores the first control program and the second control program without deleting them until at least confirmation is made that the execution target program of the first execution unit 11 has been correctly changed to the first update program and that the execution target program of the second execution unit 21 has been correctly changed to the second update program. In a case where one or both of the fact that the execution target program of the first execution unit 11 has been correctly changed to the first update program and that the execution target program of the second execution unit 21 has been correctly changed to the second update program is not confirmed, the updating unit 91 may receive the notification from the first execution unit 11 and the second execution unit 21, and output a signal for informing a user or the like of the occurrence of abnormality, in steps S113 and S114.

Thus, the sequence in the case where both the first control program and the second control program are updated is ended.

Process 2

Figure 5:
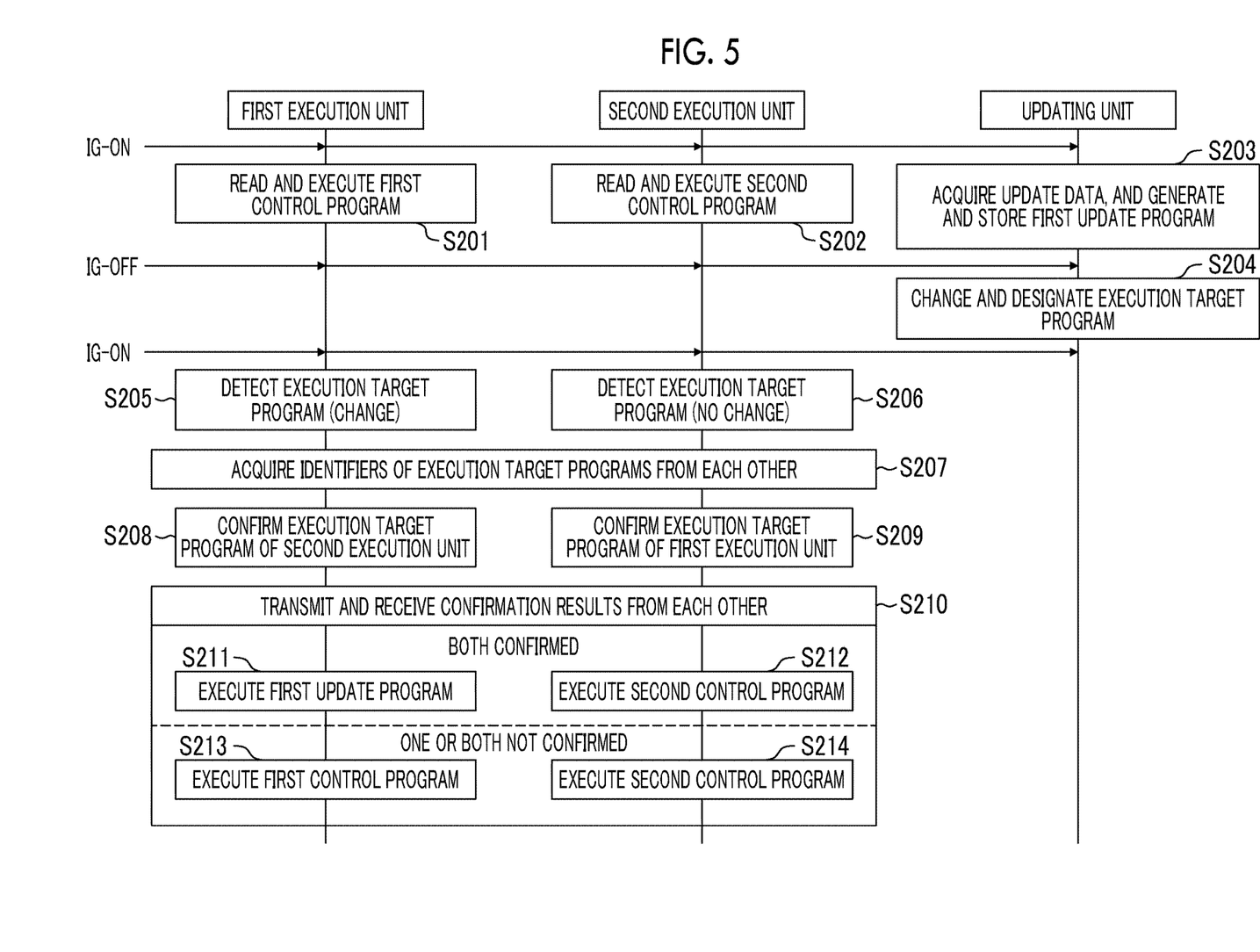
FIG. 5 is a sequence diagram illustrating another process of the vehicle control device according to the embodiment of the disclosure.

Next, the process in a case where only one of the first control program and the second control program is updated will be described. Hereinafter, a case where the first control program is updated and the second control program is not updated will be described as an example. FIG. 5 is a sequence describing the process. This sequence is started, for example, when the ignition switch is turned on.

Step S201

The first execution unit 11 reads and executes the first control program in the same manner as the above-described step S101. The first execution unit 11 can determine to read the first control program from the first control program storage area 13 as an execution target program, for example, based on the first read destination information stored in the first storage 12.

Step S202

The second execution unit 21 reads and executes the second control program in the same manner as the above-described step S102. The second execution unit 21 can determine to read the second control program from the second control program storage area 23 as an execution target program, for example, based on the second read destination information stored in the second storage 22.

Step S203

The updating unit 91 generates the first update program based on the update data. The updating unit 91 stores the first update program in the first update program storage area 14 of the first storage 12.

When the above-described processes of steps S201, S202, and S203 are executed, and the ignition switch is turned off, the following process is performed.

Step S204

The updating unit 91 changes the execution target program such that the read destination address of the first read destination information stored in the first storage 12 designates the first update program storage area 14 and designates the execution target program such that the first execution unit 11 reads the first update program from the first update program storage area 14 when the first execution unit 11 reads the next execution target program by setting a flag indicating that there has been a change.

Figure 6:
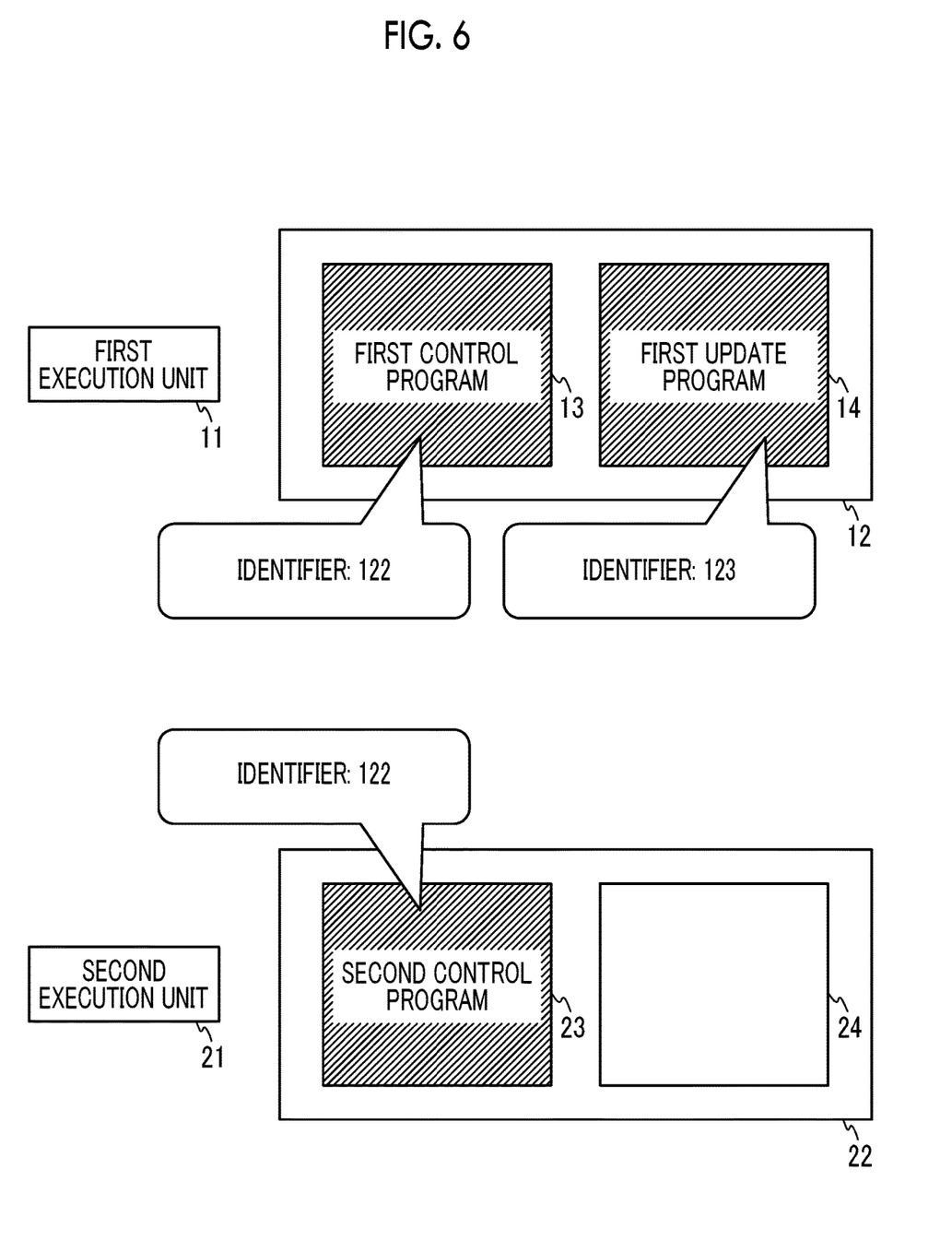
FIG. 6 is a schematic diagram of the execution unit and the storage of the vehicle control device according to the embodiment of the disclosure, in still another situation.

When the above-described process of step S204 is executed and then the ignition switch is turned on, the following process is performed. FIG. 6 shows schematically each execution unit and each storage of the vehicle control device 100 in a case where the first update program is stored in the first storage 12 and the second update program is not stored in the second storage 22. The first update program includes an identifier, which is "123" in the illustrated example. This indicates the version of the first update program.

Step S205

For example, the first execution unit 11 refers to the first read destination information stored in the first storage 12 and detects that the execution target program has been changed from the first control program stored in the first control program storage area 13 to the first update program stored in the first update program storage area 14. Further, the first execution unit 11 detects that the execution target program of the second execution unit 21 has not been changed. This is possible, for example, by referring to the second read destination information stored in the second storage 22 by the first execution unit 11. In a case where the first execution unit 11 cannot refer to the second storage 22, the updating unit 91 may also store the second read destination information in the first storage 12.

Step S206

For example, the second execution unit 21 refers to the second read destination information stored in the second storage 22 and detects that the execution target program is the second control program stored in the second control program storage area 23 based on the address or flag of the read destination. Further, the second execution unit 21 detects that the execution target program of the first execution unit 11 has been changed. This is possible by referring to the first read destination information stored in the first storage 12 by the second execution unit 21. In a case where the second execution unit 21 cannot refer to the first storage 12, the updating unit 91 may also store the first read destination information in the second storage 22.

Step S207

The first execution unit 11 reads the identifier from the first update program and notifies the second execution unit 21 of the read identifier. The second execution unit 21 reads the identifier from the second control program and notifies the first execution unit 11 of the read identifier. In this manner, the first execution unit 11 and the second execution unit 21 can acquire the identifiers of the execution target programs from each other.

Step S208

The first execution unit 11 confirms that the execution target program of the second execution unit 21 has not been changed from the second control program, based on the notified identifier of the second control program.

Step S209

The second execution unit 21 confirms whether the execution target program of the first execution unit 11 has been correctly changed to the first update program, based on the notified identifier of the first update program. For example, the second execution unit 21 stores the identifier of the first control program in the second storage 22, and since the notified identifier of the first update program represents the next version of the identifier of the first control program, the second execution unit 21 confirms that the execution target program of the first execution unit 11 has been correctly changed to the first update program. The order of the versions may be confirmed by conforming to a predetermined rule and the identifier representing the previous version may also be included in the first update program to be confirmed that it matches the identifier of the first control program. Further, in a case where the second execution unit 21 confirms that the execution target program of the first execution unit 11 has been correctly changed to the first update program, when the second execution unit 21 stores the notified identifier of the first update program in the second storage 22, it can be used as the identifier of the first control program in the next process.

Step S210

The first execution unit 11 notifies the second execution unit 21 of the confirmation result of step S208. In addition, the second execution unit 21 notifies the first execution unit 11 of the confirmation result of step S209.

Step S211

In steps S208 and S209, in a case where it is confirmed that the execution target program of the first execution unit 11 has been correctly changed to the first update program and that the execution target program of the second execution unit 21 has not been changed from the second control program, the first execution unit 11 reads and executes the first update program from the first update program storage area 14.

Step S212

In steps S208 and S209, in a case where it is confirmed that the execution target program of the first execution unit 11 has been correctly changed to the first update program and that the execution target program of the second execution unit 21 has not been changed from the second control program, the second execution unit 21 reads and executes the second control program from the second control program storage area 23. In a case where it is confirmed that the execution target program of the first execution unit 11 has been correctly changed to the first update program and that the execution target program of the second execution unit 21 has not been changed from the second control program, the updating unit 91 may receive the notification from the first execution unit 11 and the second execution unit 21, and use the first control program storage area 13 as an area for storing the first update program when the first update data is received next, in step S211 and step S212.

Step S213

In steps S208 and S209, in a case where one or both of the fact that the execution target program of the first execution unit 11 has been correctly changed to the first update program and that the execution target program of the second execution unit 21 has not been changed from the second control program is not confirmed, the first execution unit 11 reads and executes the first control program from the first control program storage area 13. Further, the first execution unit 11 causes the read destination address of the first read destination information stored in the first storage 12 to designate the first control program storage area 13, and lowers the flag.

Step S214

In steps S208 and S209, in a case where one or both of the fact that the execution target program of the first execution unit 11 has been correctly changed to the first update program and that the execution target program of the second execution unit 21 has not been changed from the second control program is not confirmed, the second execution unit 21 reads and executes the second control program from the second control program storage area 23. Although not particularly limited, it is desirable to confirm that the execution targets are correctly the first control program and the second control program by referring to the identifiers of these programs before executing the first control program and the second control program in steps S213 and S214. In addition, although not particularly limited, in order to be able to execute the first control program in this manner, the updating unit 91 desirably does not delete the first control program until at least confirmation is made that the execution target program of the first execution unit 11 has been correctly changed to the first update program and that the execution target program of the second execution unit 21 has not been correctly changed from the second control program. In a case where one or both of the fact that the execution target program of the first execution unit 11 has been correctly changed to the first update program and that the execution target program of the second execution unit 21 has not been changed from the second control program is not confirmed, the updating unit 91 may receive the notification from the first execution unit 11 and the second execution unit 21, and output a signal for notifying a user or the like of the occurrence of abnormality, in steps S213 and S214.

Thus, the sequence in the case where the first control program is updated and the second control program is not updated is ended. Further, the process in a case where the second control program is updated and the first control program is not updated may be replaced with "first" and "second" mutually in the above description.

Modification Example

Figure 7:
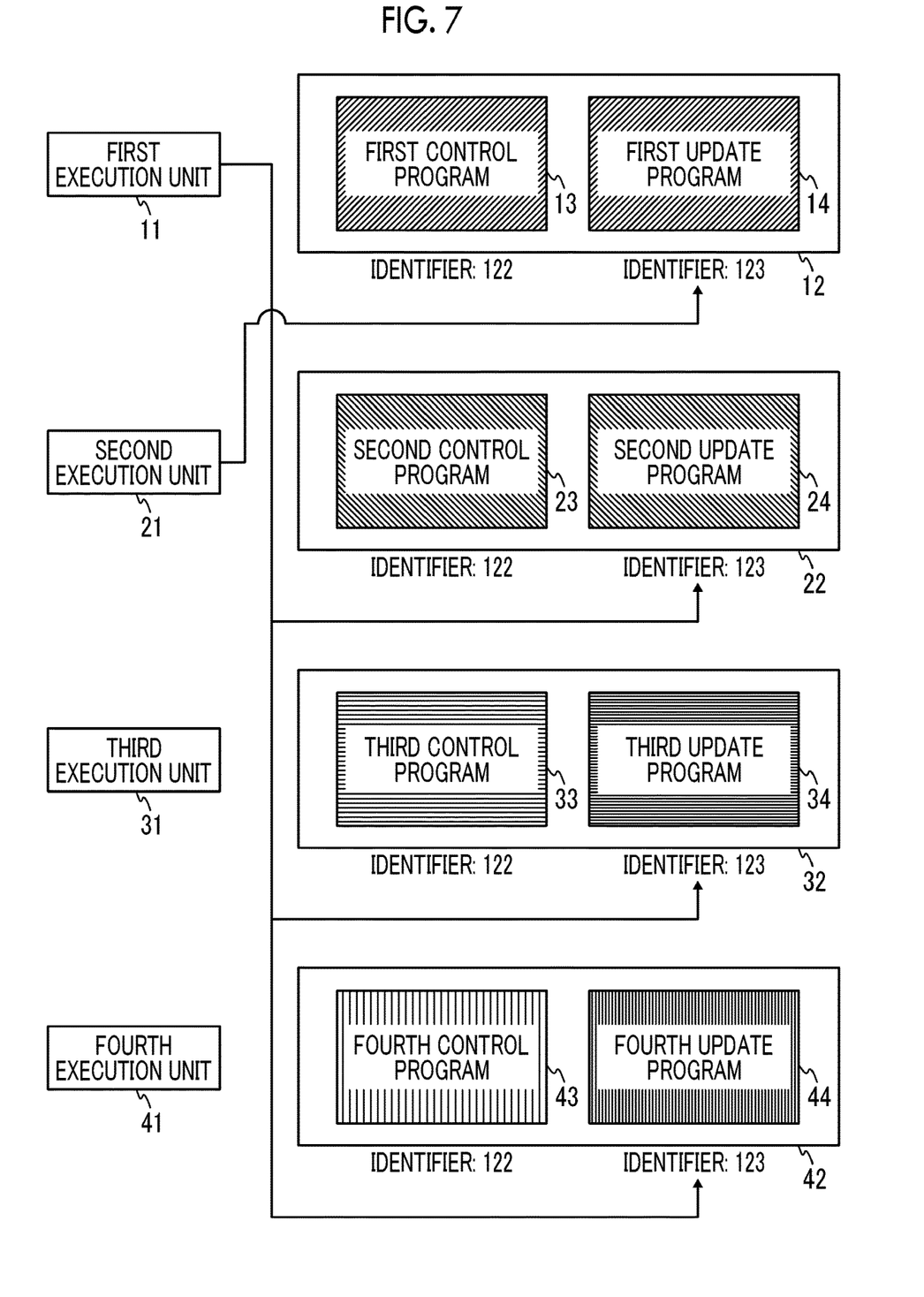
FIG. 7 is a schematic diagram of an execution unit and a storage of a vehicle control device according to a modification example of the disclosure.

In the above embodiment, the case where the number of execution units is two has been described, but the disclosure can also be applied to the case where the number of execution units is three or more. FIG. 7 schematically shows each execution unit and storage in a case where a vehicle control device 100 includes four execution units and storages. First to fourth storages 12, 22, 32, 42 have first to fourth control program storage areas 13, 23, 33, 43 for storing respective control programs executed by first to fourth execution units 11, 21, 31, 41, and first to fourth update program storage areas 14, 24, 34, 44 for storing respective update programs. In this case, when there is an update in the program, in the same manner as the above-described embodiment, the first execution unit 11 confirms the identifiers of the execution target programs of the other execution units, that is, the second, third, fourth execution units 21, 31, 41, and the second execution unit 21 confirms the identifier of the execution target program of the first execution unit 11 and shares the respective confirmation results, so that the execution target program can be confirmed for all the execution units. Note that as long as each execution unit can receive the confirmation of the execution target program from any other execution unit, the combination of the execution unit and other execution units that are confirmation targets is not limited.

In the above embodiment and modification example, each processor acquires the identifier of the execution target program from another processor when the program executed by the other processor is updated, and as long as it is confirmed that the execution target program has been actually updated, the contents and order of the process at each step may be changed, omitted, or the like as appropriate.

Effect

In the update process according to the embodiment and the modification example described above, each execution unit confirms the version of the execution target program before executing the program. Therefore, when a deviation of an execution timing of the steps, such as the process of writing the update program to the storage, and the process of switching the execution target program from the one before updating to the one after updating, which are executed by the updating unit, occurs and a state in which the version before updating and the version after updating of the program are mixed in an unexpected combination occurs, it is possible to detect the state. In this case, all the programs are returned to the previous version, which is the version before updating, or notification is sent to a user to urge the user to take action, which makes it possible to suppress execution of an unintended operation.

The disclosure is not limited to the vehicle control device, and can be applied to a confirmation method of a program executed by a processor of the vehicle control device, and a non-transitory computer readable medium storing a program for confirming the program.

The disclosure is useful for a vehicle or the like having an in-vehicle device such as an autonomous driving device.

What is claimed is:

1. A vehicle control device comprising:
   a first storage configured to store a first control program for controlling a vehicle;
   a second storage configured to store a second control program for controlling the vehicle;
   a first processor configured to execute the first control program to control a first function of the vehicle other than updating the first control program or the second control program;
   a second processor configured to execute the second control program to control a second function of the vehicle other than updating the first control program or the second control program; and
   an updating unit configured to generate a first update program based on update data acquired from a device external to the vehicle via a network, store the first update program in the first storage, and then change an execution target program of the first processor to the first update program, the first update program being an updated version of the first control program,
   wherein, in a case where the updating unit changes the execution target program of the first processor to the first update program, the second processor is configured to acquire an identifier included in the execution target program of the first processor from the first processor, and confirm that the execution target program of the first processor has been changed to the first update program based on at least the identifier acquired from the first processor.

2. The vehicle control device according to claim 1, wherein:
   the updating unit is further configured to generate a second update program based on the update data, store the second update program in the second storage, and then change an execution target program of the second processor to the second update program, the second update program being an updated version of the second control program; and
   in a case where the updating unit changes the execution target program of the second processor to the second update program, the first processor is configured to acquire an identifier included in the execution target program of the second processor from the second processor, and confirm that the execution target program of the second processor has been changed to the second update program based on at least the identifier acquired from the second processor.

3. The vehicle control device according to claim 2, wherein in a case where the updating unit changes the execution target program of the first processor to the first update program and changes the execution target program of the second processor to the second update program, when the first processor confirms that the execution target program of the second processor has been changed to the second update program, and the second processor confirms that the execution target program of the first processor has been changed to the first update program, the first processor is configured to execute the first update program, and the second processor is configured to execute the second update program.

4. The vehicle control device according to claim 2, wherein:
   in a case where the updating unit changes the execution target program of the first processor to the first update program and changes the execution target program of the second processor to the second update program, the updating unit is configured to
   store the first update program in an area in the first storage other than an area where the first control program is stored, and
   store the second update program in an area in the second storage other than an area where the second control program is stored; and
   in at least one of a case where the first processor does not confirm that the execution target program of the second processor has been changed to the second update program, or a case where the second processor does not confirm that the execution target program of the first processor has been changed to the first update program, the first processor is configured to execute the first control program, and the second processor is configured to execute the second control program.

5. The vehicle control device according to claim 2, wherein in a case where the updating unit changes the execution target program of the first processor to the first update program and does not change the execution target program of the second processor to the second update program, when the first processor acquires the identifier included in the execution target program of the second processor from the second processor and confirms that the execution target program of the second processor has not been changed from the second control program based on at least the identifier acquired from the second processor, and the second processor confirms that the execution target program of the first processor has been changed to the first update program, the first processor is configured to execute the first update program, and the second processor is configured to execute the second control program.

6. The vehicle control device according to claim 2, wherein:
   in a case where the updating unit changes the execution target program of the first processor to the first update program and does not change the execution target program of the second processor to the second update program, the updating unit is configured to store the first update program in an area in the first storage other than an area where the first control program is stored; and
   in a case where the first processor acquires the identifier included in the execution target program of the second processor from the second processor and confirms that the execution target program of the second processor has not been changed from the second control program based on at least the identifier acquired from the second processor, and the second processor does not confirm that the execution target program of the first processor has been changed to the first update program, the first processor is configured to execute the first control program, and the second processor is configured to execute the second control program.

7. The vehicle control device according to claim 2, further comprising:
   a third storage configured to store a third control program for controlling the vehicle; and
   a third processor configured to execute the third control program, wherein:
   the updating unit is further configured to generate a third update program based on the update data, store the third update program in the third storage, and then change an execution target program of the third processor to the third update program, the third update program being an updated version of the third control program; and
   in a case where the updating unit changes the execution target program of the third processor to the third update program, the first processor is configured to acquire an identifier included in the execution target program of the third processor from the third processor, and confirm that the execution target program of the third processor has been changed to the third update program based on at least the identifier acquired from the third processor.

8. The vehicle control device according to claim 1, wherein:
   the first function of the vehicle is a first driving operation of the vehicle, and
   the second function of the vehicle is a second driving operation of the vehicle.

9. An update confirmation method of a program executed by a second processor of a vehicle control device including a first storage, a second storage, a first processor, the second processor, and an updating unit, the first storage being configured to store a first control program for controlling a vehicle, the second storage being configured to store a second control program for controlling the vehicle, the first processor being configured to execute the first control program to control a first function of the vehicle other than updating the first control program or the second control program, the second processor being configured to execute the second control program to control a second function of the vehicle other than updating the first control program or the second control program, the updating unit being configured to generate a first update program based on update data acquired from a device external to the vehicle via a network, store the first update program in the first storage, and then change an execution target program of the first processor to the first update program, the first update program being an updated version of the first control program, the update confirmation method comprising:
   in a case where the updating unit changes the execution target program of the first processor to the first update program,
   acquiring an identifier included in the execution target program of the first processor from the first processor; and
   confirming that the execution target program of the first processor has been changed to the first update program based on at least the identifier acquired from the first processor.

10. A non-transitory computer readable medium storing an update confirmation program to confirm whether a program executed by a second processor of a vehicle control device has been updated, the vehicle control device including a first storage, a second storage, a first processor, the second processor, and an updating unit, the first storage being configured to store a first control program for controlling a vehicle, the second storage being configured to store a second control program for controlling the vehicle, the first processor being configured to execute the first control program to control a first function of the vehicle other than updating the first control program or the second control program, the second processor being configured to execute the second control program to control a second function of the vehicle other than updating the first control program or the second control program, the updating unit being configured to generate a first update program based on update data acquired from a device external to the vehicle via a network, store the first update program in the first storage, and then change an execution target program of the first processor to the first update program, the first update program being an updated version of the first control program, wherein the update confirmation program includes processing of, in a case where the updating unit changes the execution target program of the first processor to the first update program, acquiring an identifier included in the execution target program of the first processor from the first processor, and confirming that the execution target program of the first processor has been changed to the first update program based on at least the identifier acquired from the first processor.

\* \* \* \* \*